(12) United States Patent
Kwon et al.

(10) Patent No.: US 7,305,315 B2
(45) Date of Patent: Dec. 4, 2007

(54) METHOD OF COMPENSATING TILT USING TWO-AXIS GEOMAGNETIC SENSOR, AND ACCELERATION SENSOR, AND APPARATUS THEREOF

(75) Inventors: Oh Jo Kwon, Suwon-si (KR); Won Tae Choi, Yongin-si (KR); Chang Hyun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/300,341

(22) Filed: Dec. 15, 2005

(65) Prior Publication Data
US 2006/0241883 A1    Oct. 26, 2006

(30) Foreign Application Priority Data
Apr. 21, 2005   (KR) .................. 10-2005-0033024
Oct. 4, 2005    (KR) .................. 10-2005-0093178

(51) Int. Cl.
*G01C 17/38*   (2006.01)
*G01F 17/00*   (2006.01)
(52) U.S. Cl. .................. 702/92; 702/51; 702/151
(58) Field of Classification Search .............. 702/51, 702/151, 92; 701/224; 33/304, 355, 356; 348/333.12
See application file for complete search history.

(56) References Cited

U.S. PATENT DOCUMENTS 6,813,584 B2 * 11/2004 Zhou et al. .............. 702/151

6,957,156 B2 * 10/2005 Jo et al. .................. 702/51

FOREIGN PATENT DOCUMENTS

| JP | 2004-012416 | 1/2004 |
|----|-------------|--------|
| JP | 2004-286732 | 10/2004 |
| KR | 2004-13439  | 2/2004 |

* cited by examiner

*Primary Examiner*—John Barlow
*Assistant Examiner*—John Le
(74) *Attorney, Agent, or Firm*—Stanzione & Kim, LLP (57) ABSTRACT

The present general inventive concept relates to a method of compensating tilt using a two-axis geomagnetic sensor and an acceleration sensor and an apparatus. Using the principle where a geomagnetic field value measured in a state where one axis of the two-axis geomagnetic sensor is set up vertically is identical to a Z-axis geomagnetic field value, the Z-axis geomagnetic field value can be evaluated by using two axes of the two-axis geomagnetic sensor. Accordingly, an azimuth angle can be easily calculated, so that the azimuth angle changed by tilt can be compensated. Therefore, there is an effect that a constant azimuth can be always output even though tilt occurs. In addition, when a module of the two-axis geomagnetic sensor and the acceleration sensor is used in a mobile equipment, the two-axis geomagnetic sensor can automatically measure geomagnetic field values of three axes by a simple motion where a user vertically sets up or rotates up and down the mobile equipment. Therefore, there is an effect that a constant azimuth angle can be always output by compensating the azimuth angle changed by tilt.

17 Claims, 8 Drawing Sheets

METHOD OF COMPENSATING TILT USING TWO-AXIS GEOMAGNETIC SENSOR, AND ACCELERATION SENSOR, AND APPARATUS THEREOF

CROSS-REFERENCE TO RELATED APPLICATIONS

This application claims the benefit of Korean Patent Application Nos. 2005-33024 filed with the Korea Industrial Property Office on Apr. 21, 2005, and Korean Patent Application Nos. 2005-93178 filed with the Korea Industrial Property Office on Oct. 4, 2005, the disclosures of which are incorporated herein by reference in their entirety.

BACKGROUND OF THE INVENTION

1. Field of the Invention

The present general inventive concept relates to a method of compensating tilt using a two-axis geomagnetic sensor and acceleration sensor and an apparatus thereof, and particularly, to a method of compensating tilt using a two-axis geomagnetic sensor and acceleration sensor, which compensate an azimuth changed by tilt to perform tilt compensation so that a constant azimuth can be always output, and an apparatus thereof.

2. Description of the Related Art

In general, a geomagnetic sensor, which measures the intensity of terrestrial magnetism (or geomagnetic field) to detect an azimuth angle, can be applied as an electronic compass of which the output is changed for the better in a digital manner in comparison with a compass using a general magnetic needle.

With only a two-axis geomagnetic sensor for measuring the terrestrial magnetism, the terrestrial magnetism can be measured to output an azimuth angle. However, this is possible only when the geomagnetic sensor is horizontal to the earth surface. When the geomagnetic sensor is tilted with respect to the horizontal direction of the earth surface, errors occur on measuring the azimuth angle. The errors increase according to a tilted angle of the geomagnetic sensor.

Here, the reason why the azimuth errors occur when the geomagnetic sensor is tilted is that the terrestrial magnetism is not horizontal to the earth surface but is formed to be at a constant angle. According to the measurement result, it can be found that an angle of the terrestrial magnetism with the earth surface differs according to the latitude of the earth. In general, the angle with the earth surface is horizontal to the earth surface around the terrestrial equator, but the angle with the earth surface increases as the latitude approaches the North Pole or the South Pole. The angle becomes substantially perpendicular around the poles.

In order to compensate azimuth errors caused by the tilt of the geomagnetic sensor, a three-axis geomagnetic sensor and two-axis acceleration sensor are needed. The three-axis geomagnetic sensor serves to accurately measure the intensity and direction of terrestrial magnetism existing in a three-dimensional space, and the acceleration sensor serves to measure how much each axis of the geomagnetic sensor is tilted so as to measure a tilt angle for the tilt compensation. The acceleration sensor, which measures the earth's gravity, can measure a change in the earth's gravity to be measured in each axis to measure how much the geomagnetic sensor is titled.

As described above, the three-axis geomagnetic sensor is required to compensate tilt of the geomagnetic sensor. In this case, however, there are drawbacks in that it is difficult to manufacture the three-axis geomagnetic sensor because of the physical characteristics of the sensor and it is also difficult to commonly use the sensor because the compensation for each axis of the sensor is complicated after the sensor is manufactured. Therefore, studies of a tilt compensating method using the two-axis geomagnetic sensor recently come into the spotlight.

Figure 1:
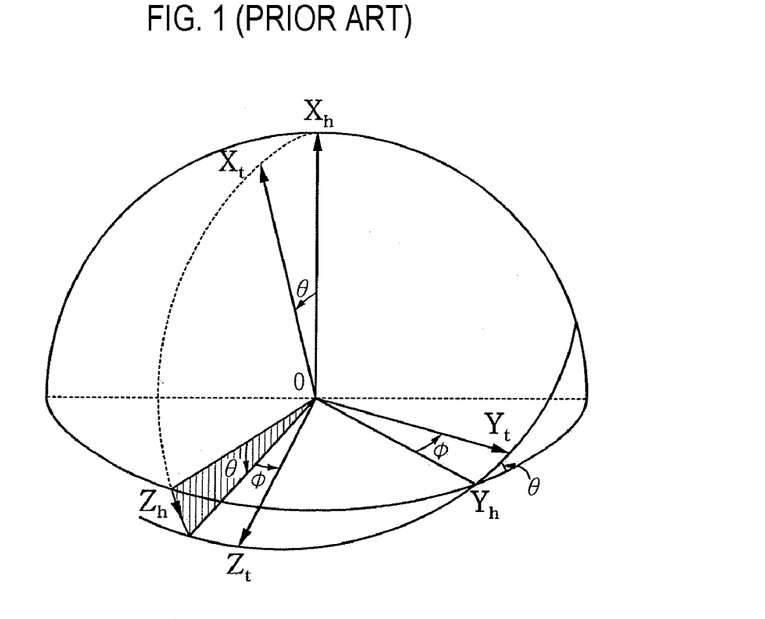
FIG. 1 is a diagram illustrating a general horizontal geomagnetic field and tilted geomagnetic field.

FIG. 1 is a diagram illustrating a general horizontal geomagnetic field and tilted geomagnetic field.

In FIG. 1, Xh, Yh, and Zh indicate values of horizontal geomagnetic field measured in the X, Y, and Z axis when the geomagnetic sensor is horizontal to a horizontal plane of the earth surface, and $X_t$, $Y_t$, and $Z_t$ indicate geomagnetic field values measured in a state where the geomagnetic sensor is tilted at a predetermined angle with a horizontal plane of the earth surface. Further, $\theta$ and $\phi$ are tilt angles obtained by the output of the acceleration sensor, $\theta$ representing a tilted angle of the X axis of the horizontal geomagnetic field and $\phi$ representing a tilted angle of the Y axis of the horizontal geomagnetic field.

Then, a method of compensating tilt using a two-axis geomagnetic sensor according to the related art will be described.

First, in order to measure an azimuth angle ($\psi$) by using the two-axis geomagnetic sensor, the two-axis geomagnetic sensor is placed horizontally to the earth surface to measure the geomagnetic field values $(X_h)(Y_h)$ of the X and Y axes. At this time, when the terrestrial magnetism is represented by H, the terrestrial magnetism (H) in the horizontal geomagnetic field is as follows.

$$H = X_h + Y_h + Z_h \qquad \text{[Equation 1]}$$

When the arctan value of two signals $(X_h)(Y_h)$ measured in the X and Y axes is calculated, a desired azimuth angle ($\psi$) can be calculated. Therefore, the azimuth angle ($\psi$) can be evaluated from Equation 1 as follows.

$$\psi = \tan^{-1}\left(\frac{Y_h}{X_h}\right) \qquad \text{[Equation 2]}$$

In this case, if the two-axis geomagnetic sensor is tilted, a complicated equation for the tilt compensation is necessary, and the compensation equation is as follows.

$$\begin{bmatrix} X_h \\ Y_h \\ Z_h \end{bmatrix} = C_t^h \begin{bmatrix} X_t \\ Y_t \\ Z_t \end{bmatrix} \qquad \text{[Equation 3]}$$

Here, $X_t$, $Y_t$, and $Z_t$ indicate geomagnetic field values measured in a state where the two-axis magnetic sensor is tilted with the earth surface, $C_t^h$ is a vector value which transforms the output of tilted two-axis geomagnetic sensor into the output in a state where the sensor is horizontal to the earth surface, and $X_h$, $Y_h$, and $Z_h$ indicate geomagnetic field values measured in three axes when the two-axis geomagnetic sensor is horizontal to a horizontal plane of the earth surface.

At this time, the vector value ($C_t^h$) to be used is as follows.

$$C_t^h = \begin{bmatrix} \cos\theta & \sin\theta\sin\phi & \sin\theta\cos\phi \\ 0 & \cos\phi & -\sin\phi \\ -\sin\theta & \cos\theta\sin\phi & \cos\theta\cos\phi \end{bmatrix} \quad \text{[Equation 4]}$$

At this time, if Equation 4 is substituted to Equation 3 to solve for $X_h$, $Y_h$, and $Z_h$, the resultant equations is as follows.

$$X_h = X_t \cos\theta + Y_t \sin\theta \sin\phi + Z_t \sin\theta \cos\phi \quad \text{[Equation 5]}$$

$$Y_h = Y_t \cos\phi - Z_t \sin\phi \quad \text{[Equation 6]}$$

$$Z_h = -X_t \sin\theta + Y_t \cos\theta \sin\phi + Z_t \cos\theta \cos\phi \quad \text{[Equation 7]}$$

Here, $\theta$ and $\phi$ indicate tilt angles to be obtained by the output of the acceleration sensor, $\theta$ representing a tilted angle of the X axis of the horizontal magnetic field and $\phi$ representing a titled angle of the Y axis of the horizontal magnetic field.

The azimuth angle ($\psi$) in a state where the two-axis geomagnetic sensor is tilted with respect to a horizontal plane of the earth surface is evaluated by substituting Equations 5 and 6 to Equation 1. The equation thereof is as follows.

$$\psi = \tan^{-1}\left(\frac{Y_h}{X_h}\right) \quad \text{[Equation 8]}$$
$$= \tan^{-1}\left(\frac{Y_t \cos\phi - Z_t \sin\phi}{X_t \cos\theta + Y_t \sin\theta\sin\phi + Z_t \sin\theta\cos\phi}\right)$$

On the other hand, when tilt is compensated by using the three-axis geomagnetic sensor, another equation is not needed in addition to the above-described equations, because $X_t$, $Y_t$, and $Z_t$ are all measured. However, when the two-axis geomagnetic sensor is used, $Z_t$ should be calculated separately because the Z-axis geomagnetic field value ($Z_t$) cannot be measured.

The solution for $Z_t$ in Equation 7 is as follows.

$$Z_t = \frac{Z_h + X_t \sin\theta - Y_t \cos\theta \sin\phi}{\cos\theta\cos\phi} \quad \text{[Equation 9]}$$

Here, in order to calculate $Z_t$, $Z_h$ (sin $\lambda$) needs to be known. Further, in order to calculate $Z_h$, an angle (a dip angle ($\lambda$)) of terrestrial magnetism with a horizontal plane of the earth surface needs to be known. The dip angle ($\lambda$), which is an angle between a vertical component of terrestrial magnetism and a horizontal plane of the earth surface, increases in the Northern Hemisphere and decreases in the Southern Hemisphere as the latitude becomes higher.

Figure 2:
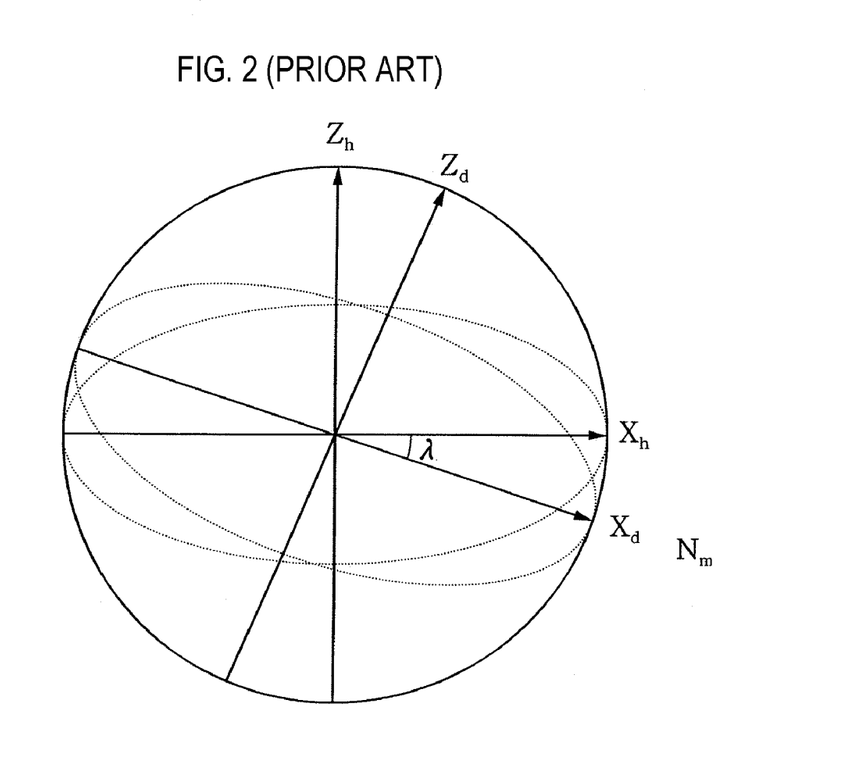
FIG. 2 is a diagram illustrating a dip angle between a general horizontal geomagnetic field and a geomagnetic field.

FIG. 2 is a diagram illustrating a dip angle between a general horizontal geomagnetic field and the geomagnetic field.

In FIG. 2, when the two-axis geomagnetic sensor is horizontal to the earth surface, $X_h$, $Y_h$, and $Z_h$ represent the values of the horizontal geomagnetic field measured in the X, Y, and Z axes, $X_d$, $Y_d$, and $Z_d$ represent geomagnetic field values, and $N_m$ represents magnetic north. Here, an angle between the geomagnetic field ($X_d$, $Y_d$, and $Z_d$) and the horizontal geomagnetic field ($X_h$, $Y_h$, and $Z_h$) is a dip angle ($\lambda$).

In a state where the two-axis geomagnetic sensor is tilted with respect to the earth surface, the signal intensities ($X_d$, $Y_d$, and $Z_d$) measured in the X, Y, and Z axes are evaluated as follows.

$$\begin{bmatrix} X_d \\ Y_d \\ Z_d \end{bmatrix} = \begin{bmatrix} \cos\lambda & 0 & \sin\lambda \\ 0 & 0 & 0 \\ -\sin\lambda & 0 & \cos\lambda \end{bmatrix} \begin{bmatrix} X_h \\ Y_h \\ Z_h \end{bmatrix} \quad \text{[Equation 10]}$$

If the X-axis, Y-axis, and Z-axis values ($X_d$, $Y_d$, and $Z_d$) of geomagnetic field measured by the two-axis geomagnetic sensor is (1, 0, 0) as in Equation 11 to be described below and the intensity of terrestrial magnetism is 1, $Z_h$ can be evaluated in Equation 12 as follows.

$$\begin{bmatrix} X_d \\ Y_d \\ Z_d \end{bmatrix} = \begin{bmatrix} 1 \\ 0 \\ 0 \end{bmatrix} \quad \text{[Equation 11]}$$

$$Z_h = \sin\lambda \quad \text{[Equation 12]}$$

Here, $Z_h$ is a value of the horizontal coordinate system measured in the Z axis when the two-axis geomagnetic sensor is horizontal to a horizontal surface of the earth surface.

In the end, in order to compensate tilt of the two-axis geomagnetic sensor, the value of $Z_h$ can be evaluated in Equation 12 in case where the dip angle ($\lambda$) is known, without measuring the value of $Z_h$. Further, the value of $Z_h$ can be substituted to Equation 9 to evaluate $Z_t$. Therefore, since the three-axis values of $X_t$, $Y_t$, and $Z_t$ can be all obtained by using the two-axis geomagnetic sensor, an error ratio of dip angle at each azimuth angle can be compensated.

Then, a method of measuring a dip angle using the two-axis geomagnetic sensor according to the related art will be described.

Figure 3:
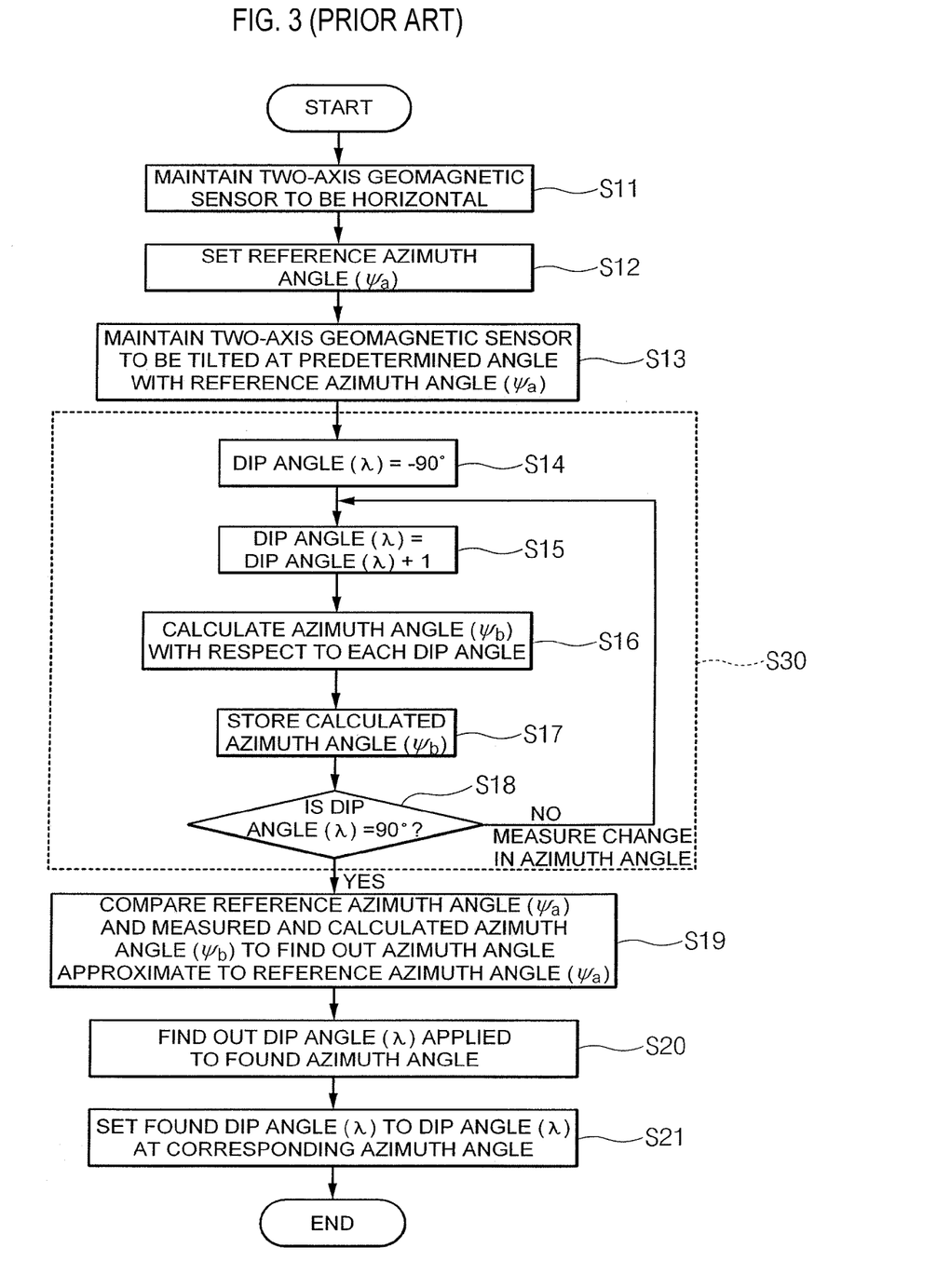
FIG. 3 is a flow chart illustrating a method of measuring a dip angle by using a two-axis geomagnetic sensor according to the related art.

FIG. 3 is a flow chart illustrating the method of measuring a dip angle using the two-axis geomagnetic sensor according to the related art.

First, after the two-axis geomagnetic sensor is maintained to be horizontal to a horizontal plane of the earth surface (Step S11), an arbitrary azimuth angle to be output from the two-axis geomagnetic sensor is set to a reference azimuth angle ($\psi_a$) (Step S12).

Then, the two-axis geomagnetic sensor is maintained to be tilted at a predetermined angle with the reference azimuth angle ($\psi_a$) (Step S13).

Then, an azimuth ($\psi_b$), which is changed after the two-axis geomagnetic sensor is tilted, is measured by the following method (Step S30).

First, while the dip angle ($\lambda$) is changed one degree at a time from −90° to 90° in Equation 10, an azimuth angle ($\psi_b$) with respect to each dip angle ($\lambda$) is calculated to be stored (Steps S14 to S 18).

A method of calculating an azimuth angle ($\psi_b$) by using the dip angle ($\lambda$) is as follows.

First, the dip angle ($\lambda$) which is changed one degree at a time from −90° to 90° is substituted to Equation 12, so that the geomagnetic field value ($Z_h$) is calculated, which is measured in the Z axis when the two-axis geomagnetic sensor is horizontal to a horizontal surface of the earth surface. Further, the value of $Z_h$ is substituted to Equation 9 to calculate $Z_t$ (the Z-axis geomagnetic field value measured in a state where the two-axis geomagnetic sensor is tilted with respect to a horizontal plane of the earth surface), and the value of $Z_t$ is then substituted to Equation 8 to calculate the changed azimuth angle ($\psi_b$).

On the other hand, the range of the azimuth angle ($\psi_b$) with respect to the dip angle ($\lambda$) which is changed one degree at a time from −90° to 90° is from 1° to 180°. Further, the range of the dip angle ($\lambda$ can be set to ±90° as described above, and can be calculated while the dip angle is changed by a certain range (for example, one degree at a time) within a predetermined range of the dip angle ($\lambda$).

Next, the reference azimuth angle ($\psi_a$) and the measured and calculated azimuth angle ($\psi_b$) are compared with each other to find out an azimuth of which the declination with respect to the reference azimuth angle ($\psi_a$) is the minimum (Step S19).

Next, the dip angle ($\lambda$) applied to the found azimuth angle is set to a dip angle ($\lambda$) at the corresponding azimuth angle to be stored (Steps S20 to S21).

As described above, the method of compensating tilt using the two-axis geomagnetic sensor according to the related art is a method where a dip angle ($\lambda$) between the terrestrial magnetism and the earth surface is measured to compensate the tilt of the two-axis geomagnetic sensor, but it is difficult to compensate tilt because the process of measuring the dip angle ($\lambda$) is complicated and difficult as described above.

In the related art, the reference azimuth ($\psi_a$) angle should be set in a state where the two-axis geomagnetic sensor is maintained to be horizontal. In this case, since large azimuth errors occur when the reference azimuth angle ($\psi_a$) is set to any one of values around some azimuth angles (for example, 0°, 90°, 180°, and 270°), the reference azimuth ($\psi_a$) must be limited to only a specific range.

In the related art, when the two-axis geomagnetic sensor is used to compensate tilt, the position thereof should be changed only in the vertical direction (PITCH). In practice, however, the two-axis geomagnetic sensor also rotates in the left and right direction (YAW) as well as in the vertical direction (PITCH). Therefore, the tilt compensation for azimuth errors is not performed properly.

In the related art, a user must perform a series of steps from a step where the two-axis geomagnetic sensor is maintained to be horizontal to a horizontal plane of the earth surface to set a reference azimuth angle ($\psi_a$) to a step where the user must stop an operation for a certain time after the two-axis geomagnetic sensor is tilted at a predetermined angle with the reference azimuth angle ($\psi_a$) until a dip angle ($\lambda$) with respect to the changed azimuth angle ($\psi_b$) is input, which is annoying and inconvenient.

SUMMARY OF THE INVENTION

Additional aspects and advantages of the present general inventive concept will be set forth in part in the description which follows and, in part, will be obvious from the description, or may be learned by practice of the general inventive concept.

The present general inventive concept has been finalized to solve those problems, and an object of the general inventive concept is that it provides a method of compensating tilt using a two-axis magnetic sensor and acceleration sensor, in which a Z-axis geomagnetic field value can be known by using a two-axis magnetic sensor and acceleration sensor so that the azimuth angle changed by tilt can be simply compensated, and an apparatus thereof.

In addition, another object of the general inventive concept is that it provides a method of compensating tilt using a two-axis geomagnetic sensor and acceleration sensor in which, when the modules of the two-axis geomagnetic sensor and the acceleration sensor are used in a mobile equipment, a user vertically sets up the mobile equipment or rotates the mobile equipment up and down so that the two-axis geomagnetic sensor measures a vertical component of geomagnetic field to automatically compensate the azimuth angle changed by tilt, and an apparatus thereof.

In order to achieve the above-described objects, according to an aspect of the present general inventive concept, a method of compensating tilt using a two-axis geomagnetic sensor and acceleration sensor includes measuring geomagnetic field values of the X and Y axes tilted at a predetermined angle by using a two-axis geomagnetic sensor; measuring gravity acceleration values of the X, Y, and Z axes in the tilted state by using a three-axis acceleration sensor; judging that the X or Y axis of the two-axis geomagnetic sensor is perpendicular when the Z-axis gravity acceleration value and the X-axis or Y-axis gravity acceleration value are all substantially 0, and storing the geomagnetic field value measured in the X or Y axis of the two-axis geomagnetic sensor as a Z-axis geomagnetic field value; and calculating an azimuth angle by using the geomagnetic field values of three axes so as to compensate the azimuth angle changed by tilt.

In this case, the Z-axis gravity acceleration value and the X-axis or Y-axis gravity acceleration value are in the range of −1 m/s² to 1 m/s².

According to another aspect of the general inventive concept, a method of compensating tilt using a two-axis geomagnetic sensor and acceleration sensor includes measuring geomagnetic field values of the X and Y axes tilted at a predetermined angle by using a two-axis geomagnetic sensor; measuring gravity acceleration values of the X, Y and Z axes in the tilted state by using a three-axis acceleration sensor; judging that the Y axis of the two-axis geomagnetic sensor is perpendicular when the Z-axis and X-axis gravity acceleration values are all substantially 0, and storing the geomagnetic field value measured in the Y axis of the two-axis geomagnetic sensor as a Z-axis geomagnetic field value; judging that the X axis of the two-axis geomagnetic sensor is perpendicular when the Z-axis and Y-axis gravity acceleration values are all substantially 0, and storing the geomagnetic field value measured in the X axis of the two-axis geomagnetic sensor as a Z-axis geomagnetic field value; and calculating an azimuth angle by using the geomagnetic field values of three axes so as to compensate the azimuth angle changed by tilt.

In this case, the Z-axis and X-axis gravity acceleration values and the Z-axis and Y-axis gravity acceleration values are in the range of −1 m/s² to 1 m/s².

Here, the method of compensating tilt further includes judging that the X axis of the two-axis geomagnetic sensor is perpendicular in the positive direction when the X-axis gravity acceleration value is positive; and judging that the X axis of the two-axis geomagnetic sensor is perpendicular in the negative direction when the X-axis gravity acceleration value is negative.

Further, the method of compensating tilt further includes judging that the Y axis of the two-axis geomagnetic sensor is perpendicular in the positive direction when the Y-axis gravity acceleration value is positive; and judging that the Y axis of the two-axis geomagnetic sensor is perpendicular in the negative direction when the Y-axis gravity acceleration value is negative.

According to a further aspect of the general inventive concept, a method of compensating tilt using a two-axis geomagnetic sensor and acceleration sensor includes measuring geomagnetic field values of the X and Y axes tilted at a predetermined angle by using a two-axis geomagnetic sensor; measuring gravity acceleration values of the X and Y axes in the tilted state by using a two-axis acceleration sensor; judging that the X or Y axis of the two-axis geomagnetic sensor is perpendicular when the X-axis or Y-axis gravity acceleration value is substantially 1 G, and storing the geomagnetic field value measured in the X or Y axis of the two-axis geomagnetic sensor as a Z-axis geomagnetic field value; and calculating an azimuth angle by using the geomagnetic field values of three axes so as to compensate the azimuth angle changed by tilt.

In this case, the X-axis or Y-axis gravity acceleration value is in the range of 8.8 m/s$^2$ to 10.8 m/s$^2$.

According to a still further aspect of the general inventive concept, a method of compensating tilt using a two-axis geomagnetic sensor and acceleration sensor includes measuring geomagnetic field values of the X and Y axes tilted at a predetermined angle by using a two-axis geomagnetic sensor; measuring gravity acceleration values of the X and Y axes in the tilted state by using a two-axis acceleration sensor; judging that the X axis of the two-axis geomagnetic sensor is perpendicular when the X-axis gravity acceleration value is substantially 1 G, and storing the geomagnetic field value measured in the X axis of the two-axis geomagnetic sensor as a Z-axis geomagnetic field value; judging that the Y axis of the two-axis geomagnetic sensor is perpendicular when the Y-axis gravity acceleration value is substantially 1 G, and storing the geomagnetic field value measured in the Y axis of the two-axis geomagnetic sensor as a Z-axis geomagnetic field value; and calculating an azimuth angle by using the geomagnetic field values of three axes so as to compensate the azimuth angle changed by tilt.

In this case, the X-axis and Y-axis gravity acceleration values are in the range of 8.8 m/s$^2$ to 10.8 m/s$^2$.

Here, the method of compensating tilt further includes judging that the X axis of the two-axis geomagnetic sensor is perpendicular in the positive direction when the X-axis gravity acceleration value is positive; and judging that the X axis of the two-axis geomagnetic sensor is be perpendicular in the negative direction when the X-axis gravity acceleration value is negative.

Further, the method of compensating tilt further includes judging that the Y axis of the two-axis geomagnetic sensor is perpendicular in the positive direction when the Y-axis gravity acceleration value is positive; and judging that the Y axis of the two-axis geomagnetic sensor is perpendicular in the negative direction when the Y-axis gravity acceleration value is negative.

According to a still further aspect of the general inventive concept, a tilt compensating apparatus using a two-axis geomagnetic sensor and acceleration sensor includes a two-axis geomagnetic sensor that measures geomagnetic field values of two axes in a tilted state; an acceleration sensor that measures gravity acceleration values in the tilted state; and a Micom that compares the two-axis geomagnetic field values received from the two-axis geomagnetic sensor with the gravity acceleration values received from the acceleration sensor so that a vertical component of geomagnetic field measured when one axis of the two-axis geomagnetic sensor becomes perpendicular to a horizontal plane of the earth surface is stored as a Z-axis geomagnetic field value, and calculates an azimuth angle by using the Z-axis value.

Here, the acceleration sensor is at least a two-axis acceleration sensor, and at least two axes thereof are arranged substantially parallel to the two-axis geomagnetic sensor.

Further, the Micom is operated by the method according to any one of the above-described aspects.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 4A:
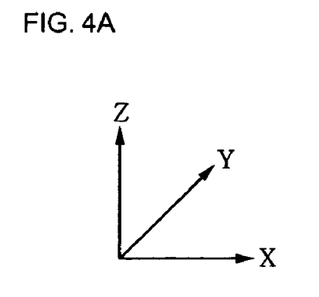
FIGS. 4A to 4C are diagrams explaining the principle of a method of compensating tilt using a two-axis geomagnetic sensor and acceleration sensor according to the present general inventive concept, FIG. 4A being a diagram illustrating an X-axis direction, Y-axis direction, and Z-axis direction of the earth's horizontal geomagnetic field, FIG. 4B being a diagram illustrating a state where the X and Y axes of the geomagnetic sensor is aligned horizontally to the X and Y axes of the horizontal geomagnetic field, and FIG. 4C being a diagram illustrating a state where the X axis of the geomagnetic sensor and the Z axis of the horizontal geomagnetic field are aligned horizontally to each other.
Figure 4B:
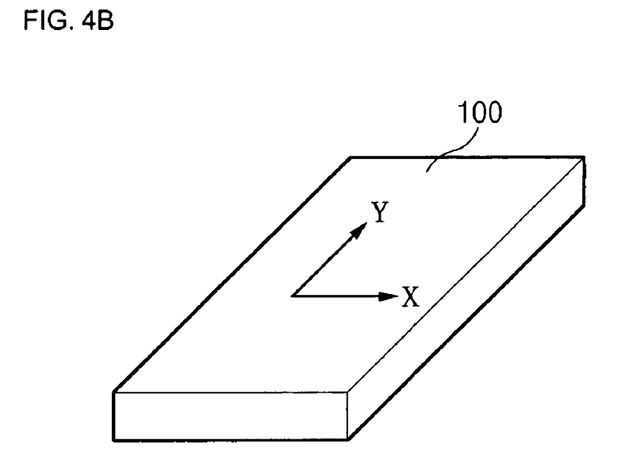
Figure 4C:
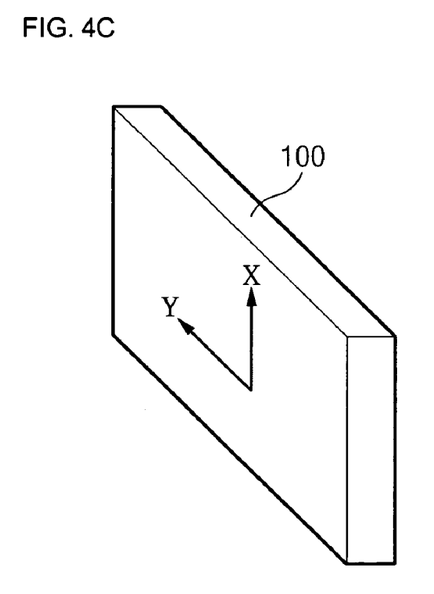

FIGS. 4A to 4C are diagrams for explaining the principle of a method of compensating tilt using a two-axis geomagnetic sensor and acceleration sensor according to the general inventive concept.

Here, FIG. 4A shows the X-axis direction, Y-axis direction, and Z-axis direction of the earth's horizontal geomagnetic field, and the X, Y, and Z axes are perpendicular to each other as known. Further, FIG. 4B shows a state where the X and Y axes of the two-axis geomagnetic sensor is horizontally aligned with the X and Y axes of the horizontal geomagnetic field, and FIG. 4C shows a state where the two-axis geomagnetic sensor in the state of FIG. 4B is vertically set up to be aligned so that the X axis of the two-axis geomagnetic sensor is horizontal to the Z axis of the horizontal geomagnetic field.

As shown in FIG. 4C, when an X-axis geomagnetic field value $(X_t)$ is measured in a state where the two-axis geomagnetic sensor is vertically set up so that the X axis is horizontal to the Z axis of the horizontal geomagnetic field, the value $(X_t)$ measured in the X axis is identical to a Z-axis geomagnetic field value $(Z_t)$.

Therefore, in the present general inventive concept in which such a principle is used, the existing two-axis geomagnetic sensor is used to obtain a value of $Z_i$, so that the azimuth angle changed by tilt can be compensated.

Hereinafter, the general inventive concept will be described in detail with reference with the accompanying drawings.

Figure 5A:
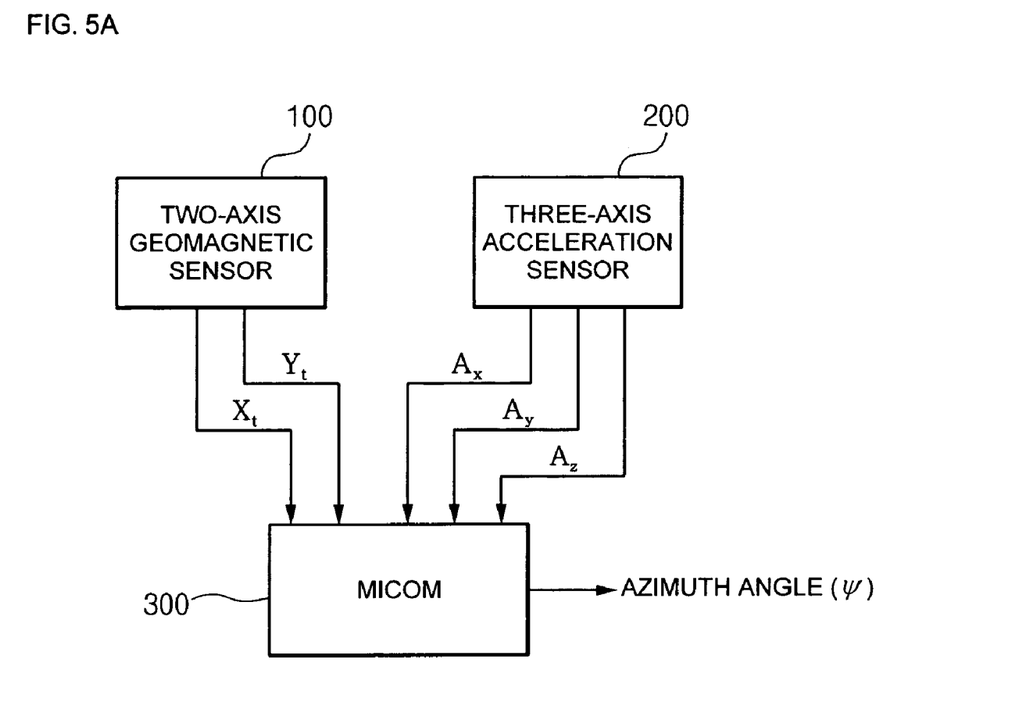
FIG. 5A is a block diagram briefly illustrating a tilt compensating apparatus using a two-axis geomagnetic sensor and three-axis acceleration sensor according to the general inventive concept.

First, FIG. 5A is a block diagram briefly illustrating a tilt compensating apparatus using a two-axis geomagnetic sensor and three-axis acceleration sensor according to the general inventive concept.

As shown in FIG. 5A, the tilt compensating apparatus is provided with a two-axis geomagnetic sensor 100 that measures two-axis (the X and Y axes) values $(X_t)(Y_t)$ of geomagnetic field in a state where the two-axis geomagnetic sensor is tilted at a predetermined angle with respect to a horizontal plane of the earth surface; a three-axis acceleration sensor 200 that measures three-axis (the X, Y, and Z axes) values $(A_x)(A_y)(A_z)$ of gravity acceleration in the tilted state; and a Micom 300 that compares the outputs $(X_t)(Y_t)$ of the two-axis geomagnetic sensor 100 with the outputs $(A_x)(A_y)(A_z)$ of the three-axis acceleration sensor 200 and simultaneously measures a vertical component of geomagnetic field to store as a Z-axis geomagnetic field value $(Z_i)$ so as to calculate an azimuth angle $(\psi)$ by using the measured three-axis geomagnetic field values $(X_t)(Y_t)(Z_i)$, when one axis (the X or Y axis) of the two-axis geomagnetic sensor 100 is set up vertically to a horizontal plane of the earth surface.

When the geomagnetic sensor is tilted at a predetermined angle, the two-geomagnetic sensor 100 transmits to the Micom 300 the values geomagnetic field $(X_t)(Y_t)$ measured in the X and Y axes in the tilted state. Further, the three-axis acceleration sensor 200 also transmits to the Micom 300 the gravity acceleration values $(A_x)(A_y)(A_z)$ measured in three axes (the X, Y, and Z axes).

In general, the earth's gravity acceleration (G), of which the magnitude is substantially 1 G(=9.8 m/s²±1 m/s²), points toward the center of the earth. Therefore, when the gravity acceleration $(A_x)$ measured in the X axis or the gravity acceleration $(A_y)$ measured in the Y axis by the three-axis acceleration sensor 200 is substantially 1 G, it can be judged that the X or Y axis of the two-axis geomagnetic sensor 100 is perpendicular (Z axis) to a horizontal plane of the earth surface. On the contrary, when the gravity acceleration $(A_x)$ measured in the X axis or the gravity acceleration $(A_y)$ measured in the Y axis by the three-axis acceleration sensor 200 is substantially −1 G, the X or Y axis of the two-axis geomagnetic sensor 100 is inversely perpendicular (−Z axis) to a horizontal plane of the earth surface.

Accordingly, in the present general inventive concept using such a principle, the existing two-axis geomagnetic sensor 100 and three-axis acceleration sensor 200 are used to measure a vertical component of terrestrial magnetism to calculate an azimuth angle $(\psi)$, so that the azimuth angle with respect to the tilt of the geomagnetic sensor can be compensated.

Figure 5B:
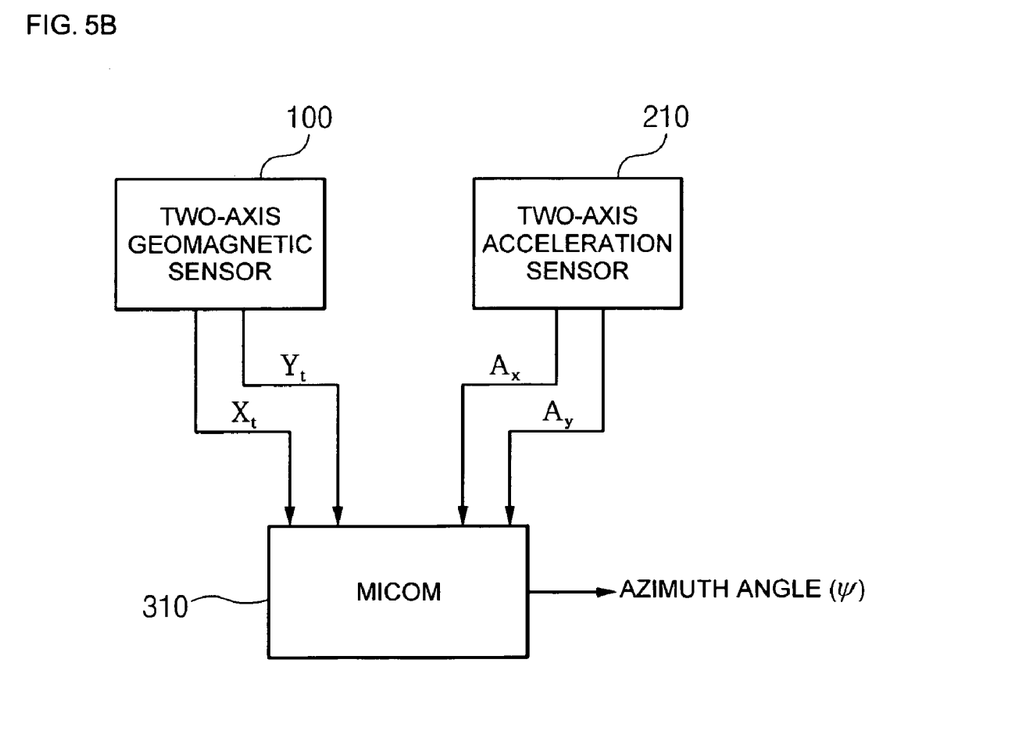
FIG. 5B is a block diagram briefly illustrating a tilt compensating apparatus using a two-axis geomagnetic sensor and two-axis acceleration sensor according to the general inventive concept.

FIG. 5B is a block diagram briefly illustrating a tilt compensating apparatus using a two-axis geomagnetic sensor and two-axis acceleration sensor according to the general inventive concept.

As shown in FIG. 5B, the tilt compensating apparatus is provided with the two-axis geomagnetic sensor 100 that measures two-axis (the X and Y axes) values $(X_t)(Y_t)$ of geomagnetic field in a state where the two-axis geomagnetic sensor is tilted at a predetermined angle with respect to a horizontal plane of the earth surface; a two-axis acceleration sensor 210 that measures two-axis (the X and Y axes) values $(A_x)(A_y)$ of the gravity acceleration in the tilted state; and a Micom 310 that compares the outputs $(X_t)(Y_t)$ of the two-axis geomagnetic sensor 100 with the outputs $(A_x)(A_y)$ of the two-axis acceleration sensor 210 and simultaneously measures a vertical component of geomagnetic field to store as a Z-axis geomagnetic field value $(Z_i)$ so as to calculate an azimuth angle $(\psi)$ by using the measured two-axis geomagnetic field values $(X_t)(Y_t)$, when one axis (the X or Y axis) of the two-axis geomagnetic sensor 100 is set up vertically to a horizontal plane of the earth surface.

When the geomagnetic sensor is tilted at a predetermined angle, the two-axis geomagnetic sensor 100 transmits to the Micom 310 the geomagnetic field values $(X_t)(Y_t)$ measured in the X and Y axes in the tilted state. Further, the two-axis acceleration sensor 210 also transmits to the Micom 310 the gravity acceleration values $(A_x)(A_y)$ measured in two axes (the X and Y axes).

Similarly, the earth's gravity acceleration (G), of which the magnitude is substantially 1 G(=9.8 ms²±1 m/s²), points toward the center of the earth. Therefore, when the gravity acceleration $(A_x)$ measured in the X axis or the gravity acceleration $(A_y)$ measured in the Y axis by the two-axis acceleration sensor 210 is substantially 1 G, it can be judged that the X or Y axis of the two-axis geomagnetic sensor 100 is perpendicular (Z axis) to a horizontal plane of the earth surface. On the contrary, when the gravity acceleration $(A_x)$ measured in the X axis or the gravity acceleration $(A_y)$ measured in the Y axis by the two-axis acceleration sensor 210 is substantially −1 G, the X or Y axis of the two-axis geomagnetic sensor 100 is inversely perpendicular (−Z axis) to a horizontal plane of the earth surface.

Accordingly, in the present general inventive concept using such a principle, the existing two-axis geomagnetic sensor 100 and two-axis acceleration sensor 210 are used to measure a vertical component of terrestrial magnetism to calculate an azimuth angle (ψ), so that the azimuth angle with respect to the tilt of the geomagnetic sensor can be compensated.

Next, equations to be applied to the method of compensating tilt using the two-axis geomagnetic sensor 100 will be described.

First, if the terrestrial magnetism is referred to as a vector H, the vector H of terrestrial magnetism in the horizontal geomagnetic field is expressed as in Equation 1.

$$H = X_h + Y_h + Z_h \quad \text{(Equation 1)}$$

Here, $X_h$, $Y_h$, and $Z_h$ are the values of horizontal geomagnetic field measured in the X, Y, and Z axes, when the two-axis geomagnetic sensor is horizontal to the earth surface.

On the other hand, if signals measured in the X and Y axes in a state where the two-axis geomagnetic sensor is set to be horizontal to a horizontal plane of the earth surface are referred to as $X_t$ and $Y_t$, a signal measured in a state where the X axis of the two-axis geomagnetic sensor is set up vertically is referred to as $Z_i$, and the terrestrial magnetism is referred to as $H_i$, the vector ($H_i$) of terrestrial magnetism is expressed as follows.

$$H_i = X_i + Y_i + Z_i \quad \text{[Equation 13]}$$

At this time, a relationship of $|H|=|H_i|$ is established from Equations 1 and 13. Therefore, vertical components of terrestrial magnetism correspond to each other.

That is, $Z_h = Z_i$ is established.

Therefore, if $Z_h$ is substituted for $Z_i$ in Equation 9, Equation 14 is obtained as below.

$$Z_t = \frac{Z_h + X_t \sin\theta - Y_t \cos\theta \sin\phi}{\cos\theta \cos\phi} \quad \text{(Equation 9)}$$

$$Z_t = \frac{Z_i + X_t \sin\theta - Y_t \cos\theta \sin\phi}{\cos\theta \cos\phi} \quad \text{[Equation 14]}$$

Here, $Z_t$ is a geomagnetic field value measured in a state where the two-axis geomagnetic sensor is tilted at a predetermined angle with respect to a horizontal plane of the earth surface.

Therefore, if $Z_i$ (the geomagnetic field value measured in a state where the X axis of the two-axis geomagnetic sensor is set up to be perpendicular) and $X_t$ and $Y_t$ (the geomagnetic field values measured in the X and Y axes in a state where the two-axis geomagnetic sensor is tilted with respect to a horizontal plane of the earth surface) are substituted to Equation 14, $Z_t$ (the intensity of the signal measured in the Z axis in a state where the two-axis geomagnetic sensor is tilted with respect to a horizontal plane of the earth surface) can be evaluated.

Accordingly, $Z_t$ obtained from Equation 14 can be substituted to Equations 5 and 6 to obtain $X_h$ and $Y_h$, and $X_h$ and $Y_h$ can be substituted to Equation 8 to calculate an azimuth angle (ψ).

$$\psi = \tan^{-1}\left(\frac{Y_h}{X_h}\right) \quad \text{(Equation 8)}$$

$$= \tan^{-1}\left(\frac{Y_t \cos\phi - Z_t \sin\phi}{X_t \cos\theta + Y_t \sin\theta \sin\phi + Z_t \sin\theta \cos\phi}\right)$$

As such, although the method in which the X-axis of the two-axis geomagnetic sensor is vertically set up to measure a Z-axis component ($Z_t$) has been described in the above, a Z-axis component ($Z_t$) can be obtained by the same method in a state where the Y axis of the two-axis geomagnetic sensor is set up vertically. Therefore, according to the present general inventive concept, when a Z-axis component is obtained by using the two-axis geomagnetic sensor, the Z-axis component can be directly obtained by using the X and Y axes of the two-axis geomagnetic sensor, without being calculated by the complicated equations as in the related art.

Hereinafter, the method in which one axis (the X or Y axis) of the two axis-geomagnetic sensor is set up vertically to measure a Z-axis component ($Z_i$) will be described in detail with reference to the accompanying drawings.

Figure 6:
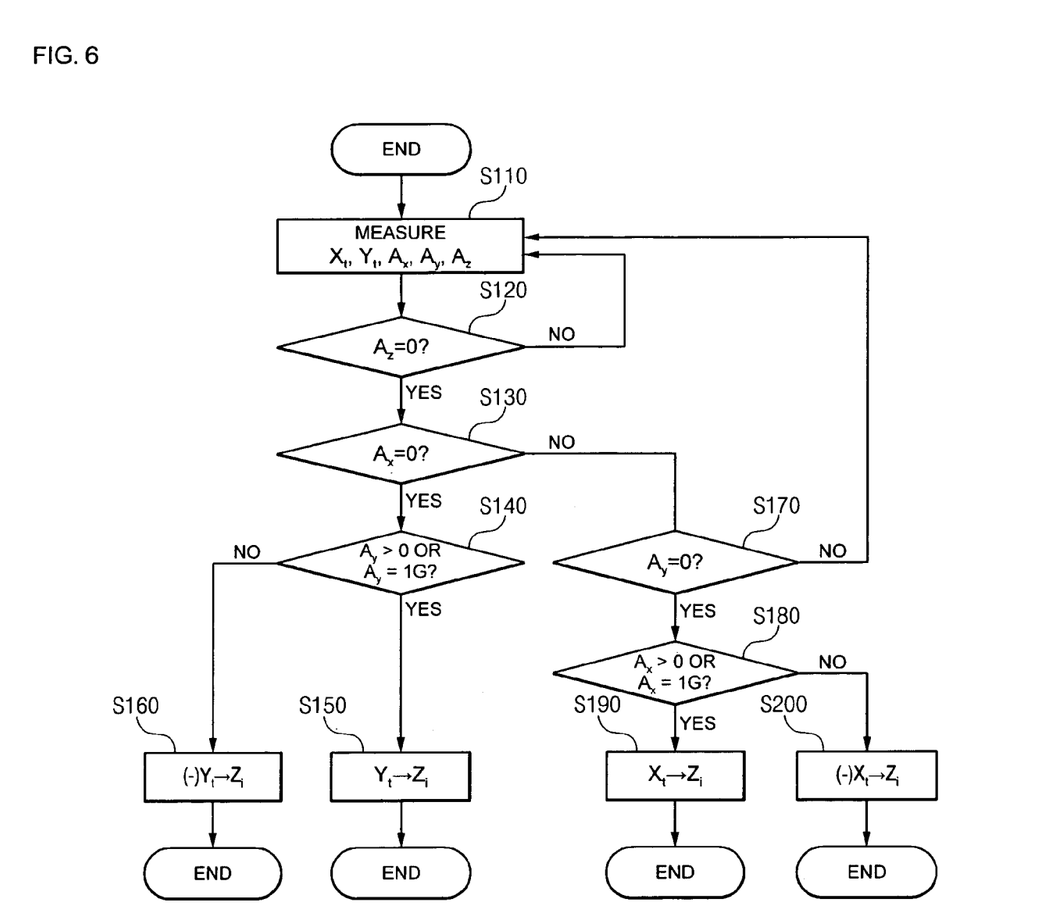
FIG. 6 is a flow chart illustrating a method of measuring a Z-axis component ($Z_i$) by using the two-axis geomagnetic sensor and three-axis acceleration sensor according to the general inventive concept.

FIG. 6 is a flow chart illustrating the method of measuring a Z-axis component ($Z_i$) using the two-axis geomagnetic sensor and the three-axis acceleration sensor according to the general inventive concept.

First, the two-axis magnetic sensor 100 measures $X_t$ and $Y_t$ (the geomagnetic field values measured in the X and Y axes in a tilted state), and the three-axis acceleration sensor 200 measures acceleration components $(A_x)(A_y)(A_z)$ of three axes (the X, Y, and Z axes) (Step S110). Here, the accelerations $(A_x)(A_y)(A_z)$ to be measured are the earth's gravity accelerations (G) in three axes (the X, Y, and Z axes). Further, it is first judged in the following step whether gravity accelerations $(A_z)(A_x)$ of two axes (the Z and X axes) are substantially 0, and it is judged whether the Y-axis acceleration value $(A_y)$ is greater than 0 $(A_y > 0)$ or is substantially 1 G $(A_y = 1\text{ G})$. At this time, if the gravity acceleration values $(A_x)(A_y)(A_z)$ of three axes are included in the range of ±1 m/s² on the basis of 0 m/s², the included values are judged to be 0. If the gravity acceleration values $(A_x)(A_y)(A_z)$ of three axes are included in the range of ±1 m/s² on the basis of 9.8 m/s², the included values are judged to be 1 G.

In other words, it is judged whether the Z-axis gravity acceleration $(A_z)$ is 0 or not. If it is 0, the step proceeds to the next step (S130) and otherwise ('no') returns to the previous step (S110) (Step 120).

As in Step 120, it is judged whether the X-axis acceleration component $(A_x)$ is 0 in the above step (S130) or not. If it is 0 ('yes'), the step proceeds to the next step (S140) and otherwise ('no') proceeds to the step (S170) (Step 130).

At this time, if the Z-axis acceleration component $(A_z)$ and the X-axis acceleration component $(A_x)$ are all 0 in the above steps (S120 and S130), it means that the Y axis of the two-axis geomagnetic sensor is set up vertically.

Next, it is judged whether the Y-axis acceleration component $(A_y)$ exceeds 0 $(A_y > 0)$ or is 1 G $(A_y = 1\text{ G})$, when the Z-axis acceleration component $(A_z)$ and the X-axis acceleration component $(A_x)$ are all 0 as described above. If the Y-axis acceleration component $(A_y)$ exceeds 0 $(A_y > 0)$ or is 1 G $(A_y = 1\text{ G})$ ('yes'), the step proceeds to the next step (S150) and otherwise ('no') proceeds to the step (S160) (Step S140).

Next, if the Y-axis acceleration component $(A_y)$ exceeds 0 $(A_y > 0)$ or is 1 G $(A_y = 1\text{ G})$ in the above step (S140), the geomagnetic field value $(Y_t)$ measured in the Y axis is stored as the Z-axis geomagnetic field value ($Z_t$) because the Y axis is perpendicular in the positive direction (Step S150).

Next, if the Y-axis acceleration component ($A_y$) is less than 0 ($A_y$<0) or is –1 G ($A_y$=–1 G) in the above step (S140), the negative value (–$Y_t$) of the geomagnetic field value ($Y_t$) measured in the Y axis is stored as the Z-axis geomagnetic field value ($Z_t$) because the Y axis is perpendicular in the negative direction (Step S160).

Next, when the Z-axis acceleration component ($A_z$) is 0 in the above step (S120) and the X-axis acceleration component ($A_x$) is not 0 in the above step (S130), it is judged whether the Y-axis acceleration component ($A_y$) is 0 or not. If it is 0 ('yes'), the step proceeds to the next step (S180) and otherwise ('no') returns to the above step (S110) (Step S170).

At this time, if the Z-axis acceleration component ($A_z$) and the Y-axis acceleration component ($A_y$) are all 0 in the above steps (S120, S130, and S170), it means that the X axis of the two-axis geomagnetic sensor is set up vertically. Therefore, when the X-axis acceleration component ($A_x$) is measured, it can be found whether the X axis of the two-axis geomagnetic sensor is set up vertically or set up inversely.

Next, when the Z-axis acceleration component ($A_z$) and the Y-axis acceleration component ($A_y$) are all 0 as described above, it is judged whether the X-axis acceleration component ($A_x$) exceeds 0 ($A_x$>0) or is 1 G ($A_x$=1 G). If the X-axis acceleration component ($A_x$ exceeds 0 ($A_x$>0) or is 1 G ($A_x$=1 G) ('yes'), the step proceeds to the next step (S190) and otherwise ('no') proceeds to the step (S200) (Step S180).

Next, if the X-axis acceleration component ($A_x$) exceeds 0 ($A_x$>0) or is 1 G ($A_x$=1 G) in the above step (S180), the geomagnetic field value ($X_t$) measured in the X axis is stored as the Z-axis geomagnetic field value ($Z_t$) because the X axis is perpendicular in the positive direction (Step S190).

Next, if the X-axis acceleration component ($A_x$) is less than 0 ($A_x$<0) or is –1 G ($A_x$=–1 G) in the above step (S180), the negative value (–$X_t$) of the geomagnetic field value ($X_t$) measured in the X axis is stored as the Z-axis geomagnetic field value ($Z_t$) because the X axis is perpendicular in the negative direction (Step S200).

Although the acceleration components ($A_x$)($A_y$)($A_z$) are compared with 0 or 1 G in FIG. 6, such a range as $A \geq A_x \geq B$ (for example, 1.5 G $\geq A_x \geq$ 0.5 G) can be substituted to be used as the judgment condition.

Figure 7:
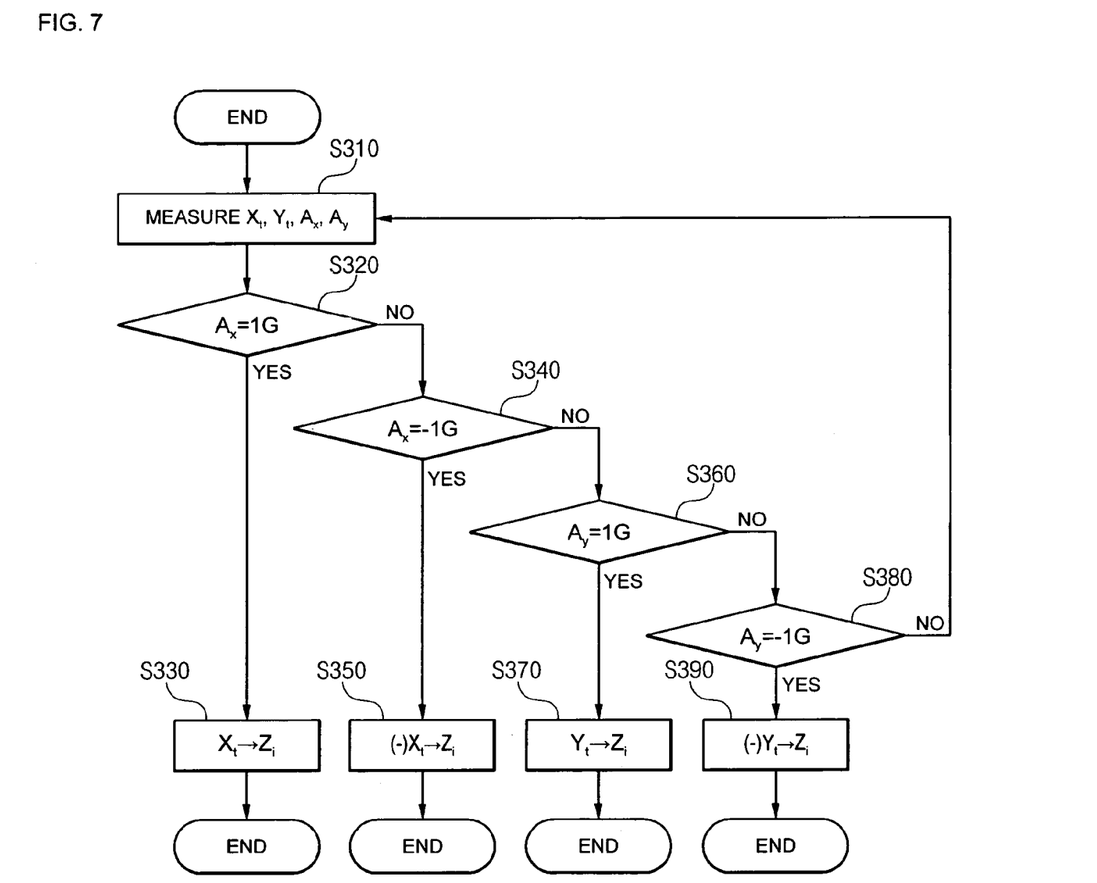
FIG. 7 is a flow chart illustrating a method of measuring a Z-axis component ($Z_i$) by using the two-axis geomagnetic sensor and two-axis acceleration sensor according to the general inventive concept.

FIG. 7 is a flow chart illustrating a method of measuring a Z-axis component ($Z_t$) using the two-axis geomagnetic sensor and two-axis acceleration sensor according to the general inventive concept.

First, the two-axis magnetic sensor measures $X_t$ and $Y_t$ (the geomagnetic field values measured in the X and Y axes in a tilted state), and the two-axis acceleration sensor measures acceleration components ($A_x$)($A_y$) of two axes (the X and Y axes) (Step S310). Here, the accelerations ($A_x$)($A_y$) to be measured are the earth's gravity accelerations (G) in the X and Y axes. As in FIG. 6, if the gravity accelerations of two-axes (the X and Y axes) are included in the range of ±1 m/s$^2$ on the basis of 9.8 m/s$^2$, the gravity accelerations are judged to be 1 G.

Next, it is judged whether the X-axis acceleration component ($A_x$) is 1 G or not. If it is 1 G ('yes'), the step proceeds to the next step (S330) and otherwise ('no') proceeds to the step (S340) (Step S320).

Next, when the acceleration ($A_x$) measured by the two-axis acceleration sensor is 1 G in the above step (S320), the signal intensity ($X_t$) measured in a state where the two-axis geomagnetic sensor is tilted with respect to a horizontal plane of the earth surface is stored as the Z-axis geomagnetic field value ($Z_t$) because the X axis of the two-axis geomagnetic sensor is perpendicular (Z axis) to a horizontal plane of the earth surface (Step S330).

Next, when the acceleration ($A_x$) measured by the two-axis acceleration sensor is not 1 G in the above step (S320), it is judged whether the X-axis acceleration component ($A_x$) is –1 G or not. If it is –1 G ('yes'), the step proceeds to the next step (S350) and otherwise ('no') proceeds to the step (S360) (Step S340).

When the acceleration ($A_x$) measured by the two-axis acceleration sensor is –1 G in the above step (S340), the X axis of the two-axis geomagnetic sensor is perpendicular (–Z axis) in the negative direction. Therefore, a negative value (–$X_t$) with respect to the geomagnetic field value ($X_t$) measured in the X axis of the two-axis geomagnetic sensor is stored as a Z-axis geomagnetic field value ($Z_t$) (Step S350).

Next, when the acceleration ($A_x$) measured by the two-axis acceleration sensor is neither 1 G nor –1 G in the above steps (S320 and S340), it is judged whether the Y-axis acceleration component ($A_y$) is 1 G or not. If it is 1 G ('yes'), the step proceeds to the next step (S370) and otherwise ('no') proceeds to the step (S380) (Step S360).

When the acceleration ($A_y$) measured by the two-axis acceleration sensor is 1 G in the above step (S360), the Y axis of the two-axis geomagnetic sensor is perpendicular (Z axis) to a horizontal plane of the earth surface. Therefore, the geomagnetic field value ($Y_t$) measured in a state where the two-axis geomagnetic sensor is tilted with respect to a horizontal plane of the earth surface is stored as a Z-axis value ($Z_t$) of horizontal geomagnetic field (Step S370).

Next, when the acceleration ($A_y$) measured by the two-axis acceleration sensor is not 1 G in the above step (S360), it is judged whether the Y-axis acceleration ($A_y$) is –1 G or not. If it is –1 G ('yes'), the step proceeds to the next step (S390) and otherwise ('no') returns to the above step (S310) (Step S380).

When the acceleration ($A_y$) measured by the two-axis acceleration sensor is –1G in the above step (S380), the negative Y axis of the two-axis geomagnetic sensor is inversely perpendicular (–Z axis) to a horizontal plane of the earth surface. Therefore, a negative value (–$Y_t$) with respect to the signal intensity ($Y_t$) measured in a state where the two-axis geomagnetic sensor is inversely tilted with respect to a horizontal plane of the earth surface is stored as a Z-axis geomagnetic field value ($Z_t$) (Step S390).

As such, the earth's gravity acceleration (G), of which the magnitude is 1 G (9.8 m/s$^2$ ±1 m/s$^2$), points toward the center of the earth. Therefore, when the acceleration ($A_x$ or $A_y$) measured by the two-axis acceleration sensor is substantially 1 G, the X or Y axis of the two-axis geomagnetic sensor is perpendicular (the Z axis) to a horizontal plane of the earth surface. On the contrary, when the acceleration ($A_x$ or $A_y$) measured by the two-axis acceleration sensor is substantially –1 G, the X or Y axis of the two-axis geomagnetic sensor is inversely perpendicular (–Z axis) to a horizontal plane of the earth surface. Using such a principle, a vertical component of geomagnetic field can be measured by using the two-axis geomagnetic sensor.

Figure 8A:
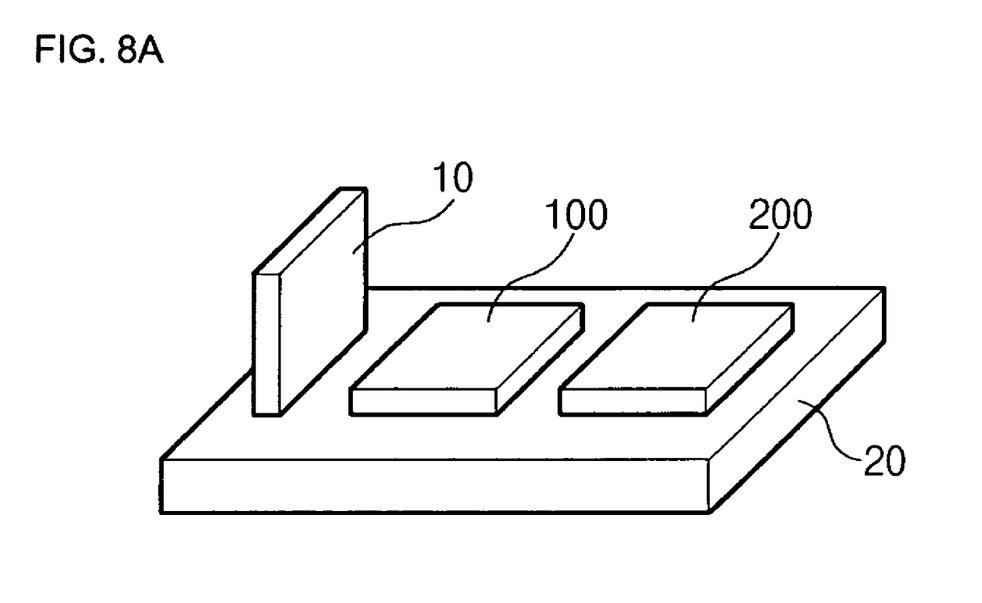
FIG. 8A is a schematic view illustrating the tilt compensating apparatus using a three-axis geomagnetic sensor and three-axis acceleration sensor according to the related art.
Figure 8B:
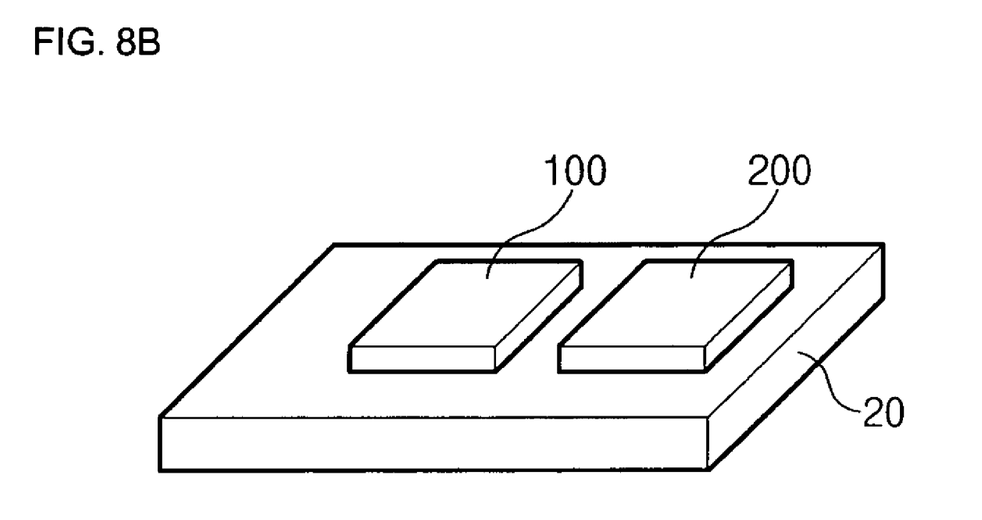
FIG. 8B is a schematic view illustrating the tilt compensating apparatus using the two-axis geomagnetic sensor and three-axis acceleration sensor according to the general inventive concept.

FIGS. 8A and 8B are diagrams for explaining and comparing the tilt compensating apparatus of the related art (8A) and the tilt compensating apparatus of the present general inventive concept (8B), FIG. 8A being a schematic view illustrating the tilt compensating apparatus using the three-axis geomagnetic sensor and three-axis acceleration sensor according to the related art, and FIG. 8B being a schematic view illustrating the tilt compensating apparatus using the two-axis terrestrial magnetism and three-axis acceleration sensor according to the general inventive concept.

Here, when the axes of the two-axis geomagnetic sensor and two-axis acceleration sensor are arranged in a row to constitute a module, a state of the two-axis acceleration sensor corresponds to a state of the two-axis geomagnetic sensor because the axes of the two-axis geomagnetic sensor and the two-axis acceleration sensor corresponds to each other. Here, the two-axis acceleration sensor or the three-axis acceleration sensor is used to judge a state of the two-axis geomagnetic sensor 100.

As shown in FIG. 8A, the tilt compensating apparatus using the three-axis geomagnetic sensor and the three-axis acceleration sensor according to the related art is provided with the two-axis geomagnetic sensor 100 that measures the X-axis and Y-axis values $(X_t)(Y_t)$ of the terrestrial magnetism in a tilted state, a one-axis geomagnetic sensor 10 that measures a Z-axis value $(Z_t)$ of the terrestrial magnetism in the tilted state, and the three-axis acceleration sensor 200 that measures gravity acceleration components $(A_x)(A_y)(A_z)$ of three axes (the X, Y, and Z axes).

When the terrestrial magnetism is measured by using the three-axis geomagnetic sensor (10)(100), a compensation operation for uniformly adjusting sensitivity of each axis is positively necessary. However, in such a case of three axes as in FIG. 8A, the compensation for the Z axis is very difficult. Further, the Z axis should be set up precisely vertically with respect to the X and Y axes, but that is very difficult when a person performs the azimuth compensation for tilt by moving his/her hands as in the case of a mobile equipment. If the Z axis is tilted with respect to the X and Y axes, that is a direct cause of azimuth error.

On the contrary, in the case of the two-axis geomagnetic sensor of FIG. 8B, a Z-axis compensation process which is positively necessary for three axes is omitted, so that the compensation is simplified. Further, since the process in which the Z axis is vertically set up is not necessary, azimuth accuracy can be increased. Furthermore, there is an advantage in that the height of the entire module is reduced so that the module is easily mounted on a mobile equipment.

In addition, the method of compensating tilt using the existing two-axis geomagnetic sensor is such a method in which a dip angle of terrestrial magnetism is measured and the intensity of terrestrial magnetism is generalized to 1 to be used. In this case, it is very likely that azimuth errors occur because the compensation method of finding the dip angle is complicated.

However, since the present general inventive concept employs such a method in which an action of a user is recognized to be automatically compensated, accurate compensation is possible even though the user does not perform the compensation in person. Further, since the compensation method is such a method in which one axis of the two-axis geomagnetic sensor is vertically set up to measure the Z-axis component of terrestrial magnetism, the compensation for every azimuth can be performed.

Figure 9A:
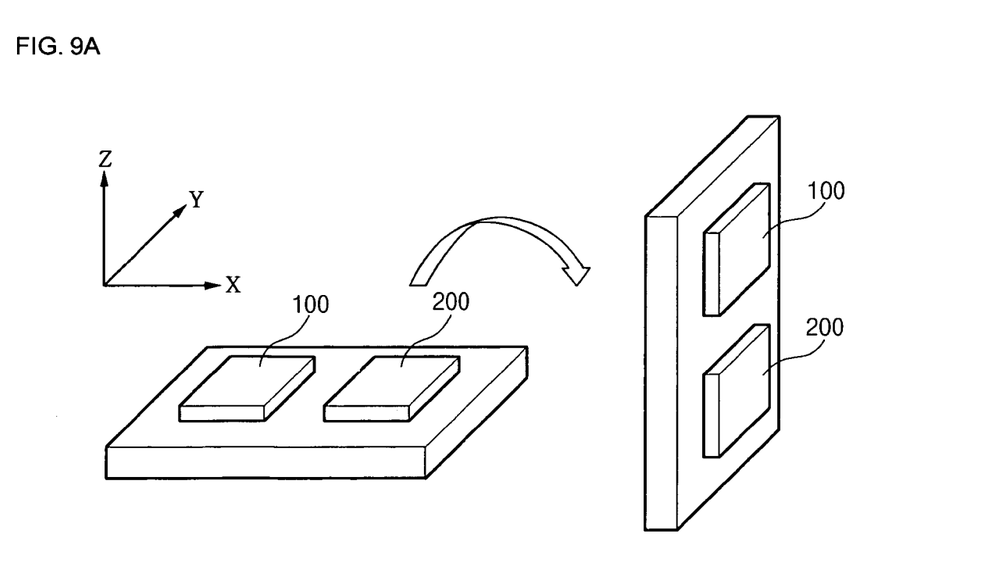
FIGS. 9A and 9B are diagrams for explaining a method of compensating tilt by using the tilt compensating apparatus using the two-axis geomagnetic sensor and acceleration sensor according to the general inventive concept, FIG. 9A being a diagram illustrating a case where the tilt compensating apparatus is moved while being perpendicular to the X axis and FIG. 9B being a diagram illustrating a case where the tilt compensating apparatus is moved while being perpendicular to the Y axis.
Figure 9B:
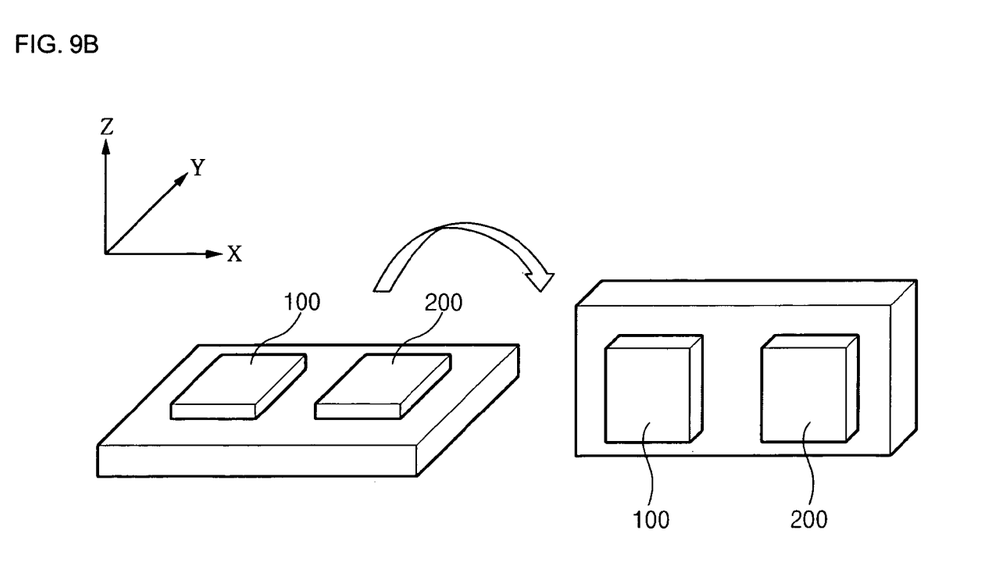

FIGS. 9A and 9B are diagrams for explaining the method of compensating tilt using the tilt compensating apparatus using the two-axis geomagnetic sensor and acceleration sensor according to the general inventive concept, FIG. 9A being a diagram illustrating a case where the tilt compensating apparatus is moved while being perpendicular to the X axis, and FIG. 9B being a diagram illustrating a case where the tilt compensating apparatus is moved while being perpendicular to the Y axis.

When the module of FIG. 9A is used in a mobile equipment, it can be imagined that a user vertically sets up the mobile equipment or rotates the mobile equipment up and down. If a user rotates the wrist so that the module becomes in such a state of FIGS. 9A or 9b, the sensor measures a vertical component of terrestrial magnetism to compensate tilt. Only with a motion where a user slightly shakes his/her wrist before use, the compensation is possible, and separate sensor compensation processes are not necessary. Since a dip angle varies according to the area at the time of position movement, the compensation should be performed frequently, which is inconvenient. However, as the compensation is simplified, the responsibility of user can be reduced.

The present general inventive concept is not limited to the above-described embodiments, but it will be understood by those skilled in the art that various changes in form and details may be made therein without departing from the spirit and scope of the present general inventive concept as defined by the appended claims.

As described above, according to the method of compensating tilt using the two-axis geomagnetic sensor and acceleration sensor according to the present general inventive concept and the apparatus thereof, a Z-axis geomagnetic field value can be obtained using two axes of the two-axis geomagnetic sensor, by using a principle in which the geomagnetic field value measured in a state where one axis of the two-axis geomagnetic sensor is vertically set up is identical to a Z-axis geomagnetic field value. Accordingly, an azimuth angle can be easily obtained, so that the azimuth angle changed by tilt can be compensated. Therefore, there is an effect in that a constant azimuth angle can be always output even though tilt occurs.

In addition, when modules of the two-axis geomagnetic sensor and acceleration sensor are used in a mobile equipment, the two-axis geomagnetic sensor can automatically measure geomagnetic field values of three axes by a simple motion where a user vertically sets up or rotates up and down the mobile equipment. Therefore, there is an effect in that a constant azimuth can be always output by compensating the azimuth angle changed by tilt.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of compensating tilt comprising:
    measuring geomagnetic field values of the X and Y axes tilted at a predetermined angle by using a two-axis geomagnetic sensor;
    measuring gravity acceleration values of the X, Y, and Z axes in the tilted state by using a three-axis acceleration sensor;
    judging that the X or Y axis of the two-axis geomagnetic sensor is perpendicular when the Z-axis gravity acceleration value and the X-axis or Y-axis gravity acceleration value are all substantially 0, and storing the geomagnetic field value measured in the X or Y axis of the two-axis geomagnetic sensor as a Z-axis geomagnetic field value; and
    calculating an azimuth angle by using the geomagnetic field values of three axes, the azimuth angle being compensated for azimuth errors caused by the tilt of the two-axis geomagnetic sensor.

2. The method of compensating tilt according to claim 1, further comprising:
   judging that the X axis of the two-axis geomagnetic sensor is perpendicular in the positive direction when the X-axis gravity acceleration value is positive; and
   judging that the X axis of the two-axis geomagnetic sensor is perpendicular in the negative direction when the X-axis gravity acceleration value is negative.

3. The method of compensating tilt according to claim 2, wherein the Z-axis and X-axis gravity acceleration values and the Z-axis and Y-axis gravity acceleration values are in the range of $-1$ m/s$^2$ to $1$ m/s$^2$.

4. The method of compensating tilt according to claim 1, further comprising:
   judging that the Y axis of the two-axis geomagnetic sensor is perpendicular in the positive direction when the Y-axis gravity acceleration value is positive; and
   judging that the Y axis of the two-axis geomagnetic sensor is perpendicular in the negative direction when the Y-axis gravity acceleration value is negative.

5. The method of compensating tilt according to claim 1, wherein the Z-axis gravity acceleration value and the X-axis or Y-axis gravity acceleration value are in the range of $-1$ m/s$^2$ to $1$ m/s$^2$.

6. A method of compensating tilt comprising:
   measuring geomagnetic field values of the X and Y axes tilted at a predetermined angle by using a two-axis geomagnetic sensor;
   measuring gravity acceleration values of the X, Y, and Z axes in the tilted state by using a three-axis acceleration sensor;
   judging that the Y axis of the two-axis geomagnetic sensor is perpendicular when the Z-axis and X-axis gravity acceleration values are substantially all 0, and storing the geomagnetic field value measured in the Y axis of the two-axis geomagnetic sensor as a Z-axis geomagnetic field value;
   judging that the X axis of the two-axis geomagnetic sensor is perpendicular when the Z-axis and Y-axis gravity acceleration values are substantially all 0, and storing the geomagnetic field value measured in the X axis of the two-axis geomagnetic sensor as a Z-axis geomagnetic field value; and
   calculating an azimuth angle by using the geomagnetic field values of three axes, the azimuth angle being compensated for azimuth errors caused by the tilt of the two-axis geomagnetic sensor.

7. The method of compensating tilt according to claim 6, further comprising:
   judging that the X axis of the two-axis geomagnetic sensor is perpendicular in the positive direction when the X-axis gravity acceleration value is positive; and
   judging that the X axis of the two-axis geomagnetic sensor is perpendicular in the negative direction when the X-axis gravity acceleration value is negative.

8. The method of compensating tilt according to claim 7, wherein the X-axis or Y-axis gravity acceleration value is in the range of 8.8 m/s$^2$ to 10.8 m/s$^2$.

9. The method of compensating tilt according to claim 6, further comprising:
   judging that the Y axis of the two-axis geomagnetic sensor is perpendicular in the positive direction when the Y-axis gravity acceleration value is positive; and
   judging that the Y axis of the two-axis geomagnetic sensor is perpendicular in the negative direction when the Y-axis gravity acceleration value is negative.

10. A method of compensating tilt comprising:
    measuring geomagnetic field values of the X and Y axes tilted at a predetermined angle by using a two-axis geomagnetic sensor;
    measuring gravity acceleration values of the X and Y axes in the tilted state by using a two-axis acceleration sensor;
    judging that the X or Y axis of the two-axis geomagnetic sensor is perpendicular when the X-axis or Y-axis gravity acceleration value is substantially 1 G, and storing the geomagnetic field value measured in the X or Y axis of the two-axis geomagnetic sensor as a Z-axis geomagnetic field value; and
    calculating an azimuth angle by using the geomagnetic field values of three axes, the azimuth angle being compensated for azimuth errors caused by the tilt of the two-axis geomagnetic sensor.

11. The method of compensating tilt according to claim 10, further comprising:
    judging that the Y axis of the two-axis geomagnetic sensor is perpendicular in the positive direction when the Y-axis gravity acceleration value is positive; and
    judging that the Y axis of the two-axis geomagnetic sensor is perpendicular in the negative direction when the Y-axis gravity acceleration value is negative.

12. The method of compensating tilt according to claim 10, further comprising:
    judging that the Y axis of the two-axis geomagnetic sensor is perpendicular in the positive direction when the Y-axis gravity acceleration value is positive; and
    judging that the Y axis of the two-axis geomagnetic sensor is perpendicular in the negative direction when the Y-axis gravity acceleration value is negative.

13. A method of compensating tilt comprising:
    measuring geomagnetic field values of the X and Y axes tilted at a predetermined angle by using a two-axis geomagnetic sensor;
    measuring gravity acceleration values of the X and Y axes in the tilted state by using a two-axis acceleration sensor;
    judging that the X axis of the two-axis geomagnetic sensor is perpendicular when the X-axis gravity acceleration value is substantially 1 G, and storing the geomagnetic field value measured in the X axis of the two-axis geomagnetic sensor as a Z-axis geomagnetic field value;
    judging that the Y axis of the two-axis geomagnetic sensor is perpendicular when the Y-axis gravity acceleration value is substantially 1 G, and storing the geomagnetic field value measured in the Y axis of the two-axis geomagnetic sensor as a Z-axis geomagnetic field value; and
    calculating an azimuth angle by using the geomagnetic field values of three axes, the azimuth angle being compensated for azimuth errors caused by the tilt of the two-axis geomagnetic sensor.

14. The method of compensating tilt according to claim 13, further comprising:
    judging that the X axis of the two-axis geomagnetic sensor is perpendicular in the positive direction when the X-axis gravity acceleration value is positive; and
    judging that the X axis of the two-axis geomagnetic sensor is be perpendicular in the negative direction when the X-axis gravity acceleration value is negative.

15. The method of compensating tilt according to claim 13, further comprising:

judging that the Y axis of the two-axis geomagnetic sensor is perpendicular in the positive direction when the Y-axis gravity acceleration value is positive; and judging that the Y axis of the two-axis geomagnetic sensor is perpendicular in the negative direction when the Y-axis gravity acceleration value is negative.

16. The method of compensating tilt according to claim 13, wherein the X-axis and Y-axis gravity acceleration values are in the range of 8.8 m/s$^2$ to 10.8 m/s$^2$.

17. A method of compensating tilt in a geomagnetic sensor, usable with electronic compasses, comprising:

measuring geomagnetic field values of X and Y axes tilted at an angle with a geomagnetic sensor;

measuring gravity acceleration values of the X and Y axes and a Z axis in the tilted state by using an acceleration sensor;

determining whether one of the X and Y axis gravity acceleration value and a Z axis gravity acceleration value are substantially zero, and storing the geomagnetic field value of the determined one of the X and Y axis as a Z-axis geomagnetic value; and using the geomagnetic values of the X, Y, and Z axes to calculate an azimuth angle and correct azimuth errors corresponding to the tilt of the geomagnetic sensor.

* * * * *